MAGNETIC CORE READ-OUT MEANS

Filed Jan. 4, 1963

INVENTOR.
JOHN C. MALLINSON
BY JOSEPH P. SWEENEY
Curtis, Morris + Safford 3,328,784
MAGNETIC CORE READ-OUT MEANS
John C. Mallinson, Palo Alto, Calif., and Joseph P. Sweeney, Harrisburg, Pa., assignors to AMP Incorporated, Harrisburg, Pa.
Filed Jan. 4, 1963, Ser. No. 249,466
6 Claims. (Cl. 340—174)

This invention relates to read-out circuit and method improvements for multi-aperture magnetic core devices.

In U.S. Patent No. 2,995,731, to Joseph P. Sweeney, there is shown and described a device for handling intelligence in binary form comprised of rows of multi-aperture magnetic cores intercoupled to permit the controlled transfer of bits of intelligence. The successful development of the technique shown therein has made it possible to build diodeless magnetic circuits for practically all computer and communication applications. In certain applications, however, there is a requirement calling for a continuous non-destructive read-out capability at one or all intelligence bit positions. With respect to the device shown in the aforementioned patent, this would require read-out from any of the O or E cores or from either all O cores or all E cores. This poses a problem not solved by the prior art. For example, in one known device, non-destructive read-out is accomplished by the provision of a read-out winding linking a core minor aperture and adapted to respond to flux changes caused by the application of a D.C. read-out pulse. It will be appreciated that circuits of this type cannot be continuous either in the sense of producing a constant indication of the intelligence state of the core or in the sense that read-out is provided while the core is being driven in the input or output phase. As a further example, another known device employs a relatively high frequency A.C. signal applied by windings linking a read-out minor aperture also coupled by a read-out winding to accomplish continuous read-out. Unfortunately, this latter circuit so reduces the range of reliable operation of the magnetic core devices to which it is applied that is not commercially feasible. In both the foregoing examples as well as the prior art in general, the core intelligence transfer circuits employ the use of diodes or transistors which use substantially negates the considerable advantage gained by having an all magnetic circuit; both from the standpoint of cost and reliability.

Accordingly, it is one object of this invention to provide an improved diodeless magnetic core circuit capable of fully continuous and non-destructive read-out.

It is a further object of invention to provide a magnetic core read-out circuit permitting the operation of magnetic core devices over a broad range of operating conditions without loss or gain of intelligence.

It is still further object of invention to provide an improved means and method for producing an indication of the intelligence state of multi-aperture magnetic core without substantially affecting the normal operation of such core.

It is another object of invention to provide multi-aperture magnetic core read-out means and method capable of producing a continuous and non-destructive read-out of improved efficiency.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

The foregoing objects are attained by the present invention through the use of RF drive and read-out load windings commonly linking a core minor aperture in a manner whereby a sufficient read-out current may be obtained without adversely affecting the defined magnetization states necessary to accomplish either a given intelligence state of the transfer of such state into or out of the core. The invention utilizes a particular RF winding to prevent the spurious setting or clearing of a given core and utilizes a particular read-out load winding to prevent the core from being blocked during the input phase of operation and to oppose undesirable MMF effects of the RF winding.

Figures 2, 3, 3A, 3B:
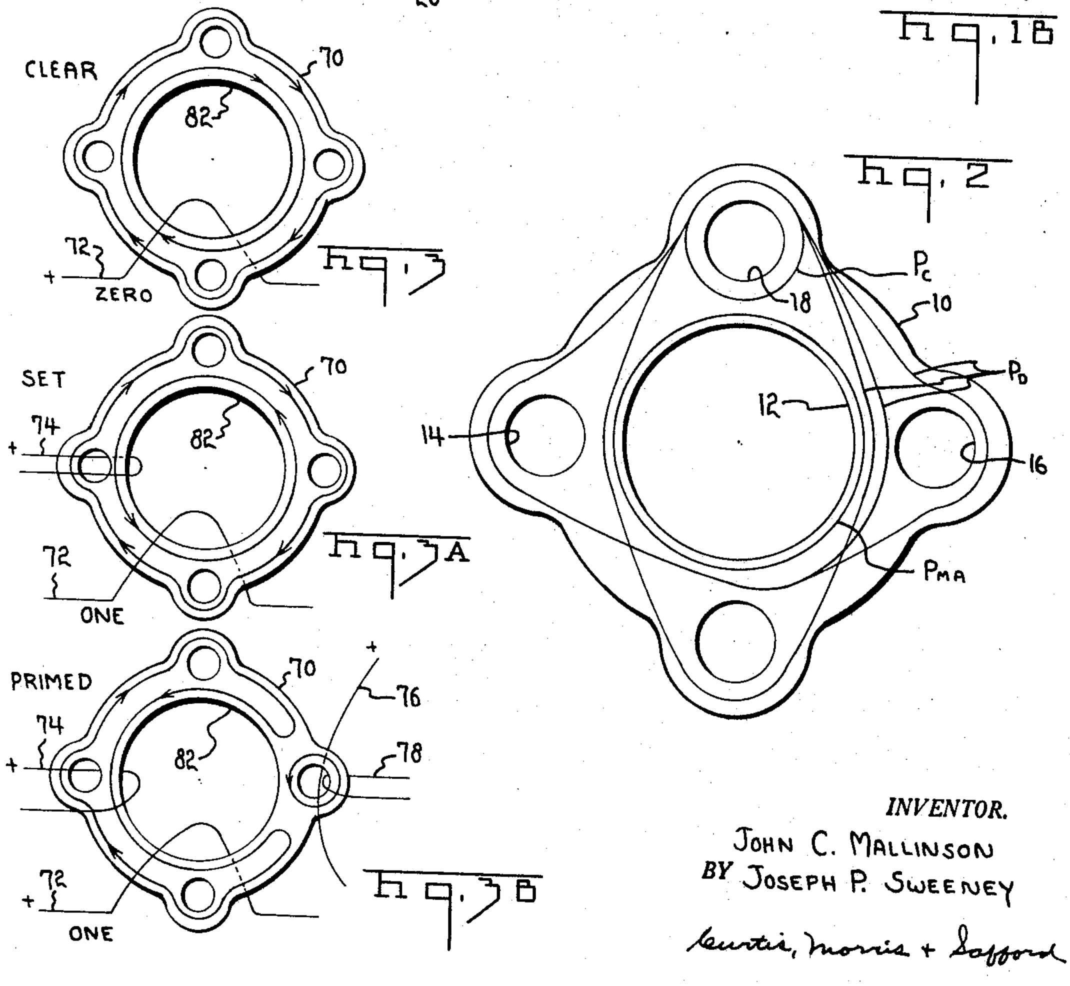

FIGURE 2 is a view of a multi-aperture core including paths of magnetic material affected by the application of MMF resulting from RF drive and load currents applied to the read-out circuit windings of the read-out circuit of the invention; and FIGURES 3–3B are views of conventional flux diagrams representing the orientation of magnetic domains existing in the defined stable states of magnetization necessary for intelligence manipulation in circuits of the type under consideration.

Figure 1:
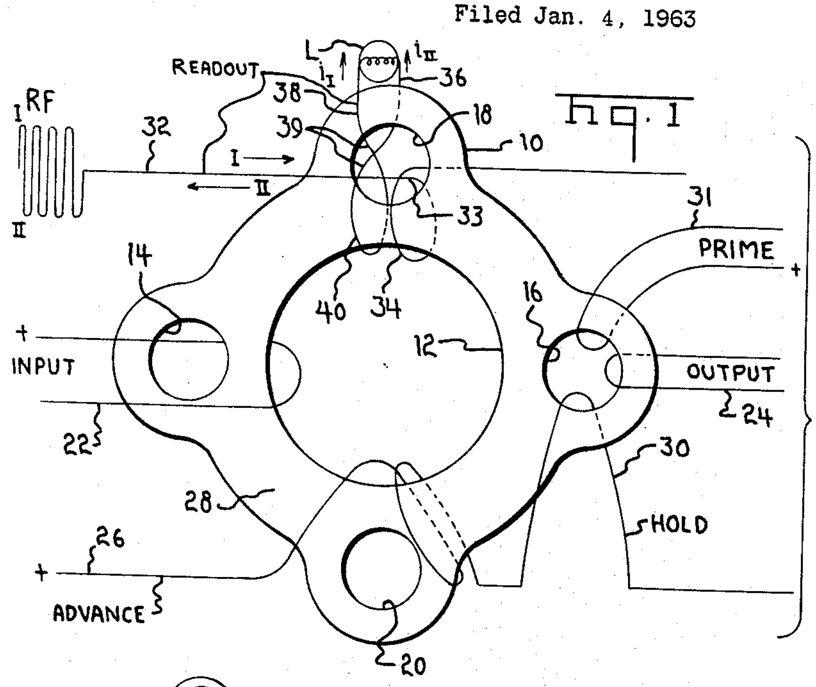
FIGURE 1 is a view of a multi-aperture core including the read-out circuit of the invention in conjunction with conventional circuit windings.

Referring now to FIGURE 1, the core and circuit shown therein may be considered as part of a magnetic device including a number of cores having similar circuits adapted to perform a given circuit function. For example, the circuit and core 10, in FIGURE 1, might be any one of the O or E cores of a shift register similar to that shown and described in the aforementioned patent to Joseph P. Sweeney. Alternatively, the read-out circuit shown with respect to FIGURE 1 could be employed on each of the O or each of the E cores of a shift register. It is of course contemplated that the invention could be employed in a device having a single multi-aperture core.

The core 10 includes a central major aperture 12 and our minor apertures 14, 16, 18 and 20 symmetrically disposed with respect to the central aperture 12 and core material width. Apertures 14 and 16 may be normally considered as input and output apertures, respectively; apertures 18 and 20 serving as auxiliary apertures. Core 10 is typical of a number of known general utility cores made of a commercial ferrite magnetic material having a relatively square hysteresis characteristic curve and capable of being driven into a number of distinct stable states of magnetization by applied MMF. Certain of these states, as shown in FIGURES 3–3B, are utilized to achieve the intelligence states necessary for operation of magnetic core devices of this type. Put differently, core 10 must be driven into the particular state shown in FIGURES 3–3B in order to accomplish a proper intelligence storage and transfer. Prior to describing the operation of the read-out circuit linking core 10, the establishment of the necessary intelligence magnetization states will be considered. The core 70 may be thought of as identical to core 10 and the windings shown may be considered as identical to the advance, input, prime and output windings of the circuit of FIGURE 1.

Vith respect to core 70 of FIGURE 3, the application ı pulse of sufficient magnitude and duration on wind- 72, will apply an MMF driving the core into negative ıration with its magnetic domains oriented as depicted the flux lines about the core major aperture. This gnetization state is conventionally termed the "zero" 'clear" state and is utilized to represent the intelligence ıntity "zero." In FIGURE 3A, core 70 is shown fol- ring the application of a pulse to winding 74 of icient amplitude and duration to reverse the orienta- ı of the magnetic domains about an inner path extend- around the core major aperture leaving the core a sense of negative saturation about the outer path. is state is utilized to represent the intelligence "one" e, or as is frequently termed, the "set" state. FIGURE depicts core 70 in its transfer or "primed" state. e application of a pulse on winding 76 threading the e minor aperture as indicated will, if the core is then its "set" state, operate to produce a magnetization te somewhat as depicted with a path of flux closure the anti-clockwise sense about the particular minor erture which is being primed. The next application of pulse to winding 72 will cause a flux change inducing EMF and causing current flow in a winding such as linking the primer minor aperture; the core at the ne time being driven back into the state shown in GURE 3. This latter operation serving to produce 'one" output or transfer from core 70. If the magnetiza- n states shown in FIGURES 3–3B are not properly hieved for any reason, a core device may be expected malfunction. For example, if the core is supported be in the "clear" state shown in FIGURE 3, but is fact only partially "clear" with a considerable percent- e of the magnetic material unsaturated or positively turated, then the application of a pulse on winding will produce an output which appears to be a "one" ther than a "zero." If the "primed" state shown in GURE 3B is not fully achieved when the core has en "set," the application of a clearing pulse will produce insufficient flux change and the output produced there- may appear as a "zero." These and other problems ll be experienced if the MMF's necessary to accomplish e various states are substantially reduced or if such MF's are so opposed as to produce flux switching in ths other than those shown. It is therefore important the satisfactory operation of core devices that the MMF d reluctance effects of auxiliary circuits such as those read-out windings not substantially oppose the MMF's the transfer circuit or the flux switching paths required.

With the foregoing in mind, the operation of the cir- it of FIGURE 1 in transferring intelligence in the form pulses representative of "ones" and "zeros" into and ıt of core 10 will be briefly summarized. Considering re 10 in the "clear" or "zero" state shown in FIG- RE 3, the application of an Advance pulse via wind- g 26 will drive the core further into negative satura- on producing an insubstantial flux change and an insub- antial output on winding 24, linking the minor aperture 6. The core may be considered as transmitting a "zero" uring such operation. The application of an input pulse f sufficient amplitude and duration on winding 22 will rive core 10 into the state shown in FIGURE 3A, ıereby setting the core which may then be considered s containing a "one." The application of priming current ia winding 32 will thereafter drive the core into the ate shown in FIGURE 3B and the application of the ext Advance pulse on winding 26 will thereafter cause ore 10 to be driven in the state shown in FIGURE 3. he accompanying flux change inducing a voltage and urrent in winding 24 of the magnitude considerably arger than in the "zero" transfer case just considered. Core 10 may be thought of transmitting a "one" during his operation. It will be noted that advance winding 6 includes two turns 28 passing down through aperture 2 and one turn 30 passing up through aperture 16.

The turns 28 serve the clearing function described with respect to winding 72 in FIGURE 3 and the turn 30 serves a holding function which operates to "hold" the core 10 against the backward transfer of flux in winding 24, which may be considered as coupling an adjacent magnetic core. If the output winding 24 is coupled into a relatively high impedance such as a voltage sensitive device, the "hold" turn 30 may be eliminated.

In the foregoing manner, intelligence in binary form may be stored or transferred in core 10 selectively to accomplish a variety of memory and logic functions.

Turning now to the problem of read-out, a usable signal must be provided indicating the intelligence state of core 10 in a manner compatible with the operation of the core circuit in achieving the various states shown and described with respect to FIGURES 3—3B. In other words, a read-out signal must be developed which is sufficient to drive known indicating devices and to provide a proper discrimination indicating whether core 10 contains a "zero" or a "one" without interfering with the normal transfer cycle and without altering the intelligence state of core 10. The read-out circuit of FIGURE 1 includes a drive winding 32, having two turns 33 passing through aperture 18 and one turn 34 passing through aperture 12. With respect to positive polarity, current flow winding 32 passes down through aperture 18 twice and up through aperture 12 once to form a "figure 8." Applied to winding 32 is an alternating current of radio frequency, RF, which may be considered as comprised of generally sinusoidal pulses I and II of opposite and approximately equal quantity. Application of the RF signal will result in a rapidly reversing MMF being applied to core 10, including two units of such MMF applied by the two turns of winding 33 and one unit of such MMF applied by winding 34. Considering the effect of the RF drive on the core, reference is made to FIGURE 2 depicting core 10 with all windings removed but including paths of magnetic material driven by the drive and load MMF. The paths $P_c$, $P_{ma}$ and $P_d$ may be considered as representing possible paths of flux closure about which switching may occur responsive to the application of MMF by windings 33 and 34. Considering phase I or the positive portion of the RF drive applied as shown in FIGURE 1, it will be apparent that two units of MMF will be applied to path $P_c$ and to paths $P_d$ in a clockwise sense, and one unit of MMF will be applied in a counterclockwise sense to path $P_{ma}$. As a result of this, the magnetic material about paths $P_d$ will experience a net MMF effect of only one unit; the MMF applied to path $P_{ma}$ operating to substantially cancel one unit of MMF of the two units applied by winding 33. The net MMF applied to core 10 as a result of windings 33 and 34 will be two units clockwise applied to path $P_c$ and only one unit clockwise applied to $P_d$; and one unit anti-clockwise applied to path $P_{ma}$. Thus, the MMF available for accomplishing read-out will be twice that tending to disturb either core major path.

The read-out winding 38 includes two turns 39 passing through aperture 18 and one turn 40 passing through aperture 12. Further included is an indicating device represented here by a signal lamp L in series with winding 38. Considered with respect to the polarity of a given current flow, it is to be noted that winding 38 provides an effective two turns in the same direction with respect to aperture 18 and one turn in an opposite direction with respect to aperture 12. It is to be further noted that the circuit formed by winding 38 includes a loop about the outer leg of magnetic material about aperture 18 and a loop about the inner leg of magnetic material about aperture 18; the loops being opposed with respect to voltages induced due to flux switched under both legs in the same direction. As will be explained hereafter, this latter feature serves to prevent the diminution of setting flux by back MMF effects. As a result of the winding configuration and turns ratio of winding 38, a load current flowing in the winding will have a back MMF effect on path $P_c$ of two units for each unit applied to $P_d$ and $P_{ma}$; one unit being effectively cancelled in the manner above described.

Considering now the cumulative MMF effect of the RF drive and load current and assuming that the RF current is sufficiently large, it will be apparent that the MMF due to phase I of the RF drive will switch flux in a clockwise sense about aperture 18; the resulting change in flux operating to induce a voltage carrying a current $i_I$ in the sense indicated in windings 39 of the load winding. Similarly, phase II of the RF drive will effect a flux change inducing a current $i_{II}$ in turns 39 threading aperture 18. The currents $i_I$ and $i_{II}$ will, of course, be proportional to the rate of flux switched about aperture 18 and the impedance of winding 38 at the load. The quantity of flux which may be switched about aperture 18 by an MMF not exceeding the core threshold or the threshold of a path such as $P_d$ varies dependent upon the magnetization or intelligence state of the core. When the core is in the state shown in FIGURE 3, the effective threshold of a material path about aperture 18, such as $P_c$, is higher by a considerable amount than when the core is in the state depicted in FIGURE 3A. Utilizing this, the MMF applied by drive winding 32 may be made large enough to switch both elastic and remanent flux about aperture 18 when the core is in the state shown in FIGURE 3A but small enough so as to switch only elastic flux about aperture 18 when the core is in the state shown in FIGURE 3. In this manner, the induced currents $i_I$ and $i_{II}$ may be made relatively large when the core is in the "one" state and relatively small when the core is in the "zero" state. If the effective threshold of the indicating device, such as signal lamp L is greater than the current or voltage induced by elastic flux changes and less than the voltage or current induced by elastic plus remanent flux changes then the device may be made to operate in different states for core "zero" content and core "one" content. In other words, the signal lamp L may be made to light when the core is in the "one" state and not to light when the core is in the "zero" state. While a bi-polar device, such as signal lamp L, is shown, it is, of course, contemplated that a unipolar device might be utilized driven by either $i_I$ or $i_{II}$.

It has been found that the application of an excessive MMF to core read-out windings may itself cause spurious loss or gain of intelligence by acting to "set" or "clear" a given core or to gradually "clear" a "set" core, or to prevent, by opposition, the transfer of flux necessary to achieve the "set" or "primed set" state. The first of these problems is avoided by the circuit of FIGURE 1 by limiting the MMF applied to accomplish read-out. This may be accomplished by adjusting the amplitude of the applied RF drive in conjunction with the number of turns threading the read-out aperture to provide an MMF slightly less than the lowest soft threshold of the core, i.e. slightly less than the milliampere turns necessary to switch remanent flux about one of the paths $P_d$ or $P_{ma}$. The other problems are solved by reducing the effective MMF applied to the core material path adjacent input and output minor apertures to an absolute minimum and by eliminating the loading effect of the read-out winding as "seen" by setting MMF. As a practical matter, these requirements must be balanced against a requirement of sufficient voltage and current induced in the read-out winding to drive the load. The configuration of winding 38, with respect to the inner and outer legs adjacent aperture 18, operates to eliminate undesirable loading effects due to "setting" flux being forced into one or the other legs. Because of the oppositely wound loops formed by winding 38, "setting" flux will be forced to split, one-half going on each side of aperture 18. As an incidental advantage of this configuration an accidental short occurring in the indicating device or elsewhere across the outer loop will not block the core from operation as would otherwise be the case. The turns ratios of two to one minor to major of the drive and load windings operates to provide a maximum load current with a minimum MMF applied to the core major path. The read-out winding turns 40 will operate to provide a back MMF opposing the MMF resulting from winding 34 and further reducing the MMF effect on path $P_d$ and $P_{ma}$. By contrast with prior art read-out circuits having single loop turns and an applied drive limitation of a quantity slightly less than the core threshold, the circuit of the present invention extends the drive limitation to a quantity of slightly less than twice the core threshold plus the back current times load turns; an improvement of better than 100 percent.

Figure 1A:
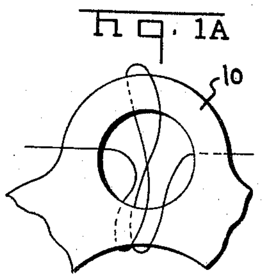
FIGURE 1A is a view of an alternate embodiment of the drive portion of the read-out circuit of FIGURE 1.
Figure 1B:
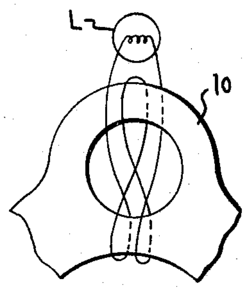
FIGURE 1B is an alternate embodiment of the read-out load winding of the read-out circuit of FIGURE 1.

While the circuit of FIGURE 1 shows windings including two turns threading the core minor aperture and one turn threading the major aperture, it is, of course, contemplated that a larger number of turns could be employed as long as the ratio of turns, minor to major, is maintained. For example, the RF drive winding might be made to include four turns passing through the minor aperture and two turns through the major aperture in the manner depicted in FIGURE 1A. The same configuration could be extended so that the number of turns could be increased to six to three, eight to four or some other number, minor to major. With an increase in turns, the amplitude of the applied drive, RF, must be reduced proportionately so that the net MMF resulting from the read-out drive winding will be as above considered. As indicated in FIGURE 1B the read-out winding 38 may also be made to include a greater number of turns, of course, maintaining the ratios as set forth with respect to FIGURE 1A. In this event, the number of turns in the read-out winding must be limited so that the induced current will provide a back MMF compatible with the MMF applied by the drive winding turns.

It is fully contemplated that multi-aperture core devices having other geometries than that indicated in FIGURES 1–3B may utilize the read-out circuit above described. For example, the invention might be utilized with magnetic device geometries having a considerable number of major and minor apertures formed in a unitary ferrite core.

In an actual unit constructed in accordance with the invention, a five aperture ferrite core of commercial magnetic material having the approximate dimensions of 240 mils major aperture, 22 mils minor aperture, 360 mils core width and 60 mils core thickness (thousandths of an inch). The RF drive winding included four turns down through the core read-out minor aperture and two turns up through the core major aperture and a load winding having six turns down through the minor aperture and three turns up through the major aperture as viewed with respect to the polarities of phase I indicated in the circuit of FIGURE 1. The RF drive included generally sinusoidal pulses of approximately 400 milli-amperes amplitude (peak to peak) at a frequency of 300 kc. The read-out circuit included, as an indicating device, a General Electric GE 331 signal lamp rated at 0.060 a., 1.3 volts. The drive and load windings were comprised of Formvar insulated wire. The unit was found to produce a satisfactory indication of the intelligence state of the core without diminishing the core "set" state and without interfering with the core transfer operation over a range compatible with standard electronic equipment with respect to changes in temperature and deviations applied current and voltage.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

We claim:

.. An improved read-out circuit for providing an indi- .on of the intelligence state of a magnetic core having .east a major aperture and a plurality of minor aper- ›s including in combination, drive means including a /e winding linking a given minor aperture for provid- readout, said drive winding providing a first MMF able of switching flux about said given core minor rture, said drive winding also linking the core major rture to provide simultaneously a second MMF op- ing said first MMF in its effect on a path of possible : switching about said core major aperture adjacent to l given minor aperture; load means including a read- winding linking said given minor aperture and re- nsive to flux switched about said given core minor aper- ; said readout winding further linking said major rture to produce further an MMF opposing said second ΛF with respect to the core major aperture whereby minimize the tendency of drive to disturb the intelli- ıce state of a core while providing a readout therefrom.

!. The circuit of claim 1 wherein said drive means in- des a high frequency alternating current applied to a ıding having a plurality of turns passing through said ıor aperture and a winding having one-half of said rality of turns passing in a relative opposite sense ough said major aperture.

}. The circuit of claim 1 wherein the said load means ludes a winding having a plurality of turns passing ough said minor aperture, and a winding having one- f of said plurality of turns passing in a relative oppo- ; sense through said major aperture.

ł. The circuit of claim 1 wherein said load means in- des windings forming loops about legs of magnetic ma- ial of said minor aperture; the said loops being posi- ned to produce equal loading effects on said legs re- onsive to flux switched about said major aperture.

5. An improved read-out circuit for providing a read- t of the intelligence state of a multi-aperture magnetic re, including a drive winding having 2 N turns thread- ; a core minor aperture in a first sense, and N turns eading an adjacent core major aperture in an opposite sense; a load circuit including an indicating device in circuit with a winding having 2 M turns threading the said minor aperture in one sense and M turns threading the said major aperture in an opposite sense whereby an alternating current applied to said drive winding will produce an alternating MMF operating on said core with twice the effect about said minor aperture as about said major aperture, and the said load winding will produce a back MMF opposing the drive MMF in paths about the core minor and major apertures where N and M are integers.

6. In a magnetic core device of the type employing multi-path magnetic cores intercoupled by transfer, advance and prime windings and adapted to store or transfer intelligence in a controlled manner, the improvement comprising a read-out circuit capable of producing an indication of the intelligence state of at least one core of said such device in a continuous and non-destructive manner, including a source of high frequency alternating current connected to a drive winding having 2 N turns intersecting a minor path of said core and one N turn intersecting a major path of said core in a reverse sense; a load winding including a readout device adapted to be driven by current induced by flux switched about a core minor path having in series therewith a winding including 2 M turns intersecting the said core minor path and M turns intersecting said core major path in an opposite sense, N and M being integers.

References Cited

UNITED STATES PATENTS

| | | | |
|---|---|---|---|
| 2,851,677 | 9/1958 | Crooks | 340—174 |
| 3,059,224 | 10/1962 | Post | 340—174 |
| 3,156,905 | 11/1964 | Stram | 340—174 |
| 3,197,745 | 7/1965 | Sweeney | 340—174 |
| 3,229,267 | 1/1966 | Engelbart | 340—174 |

BERNARD KONICK, *Primary Examiner.*

TERRELL W. FEARS, *Examiner.*

M. S. GITTES, *Assistant Examiner.*